Feb. 5, 1924.  
E. T. GUNDLACH  
AMUSEMENT DEVICE  
Filed Sept. 17, 1921  
1,482,554
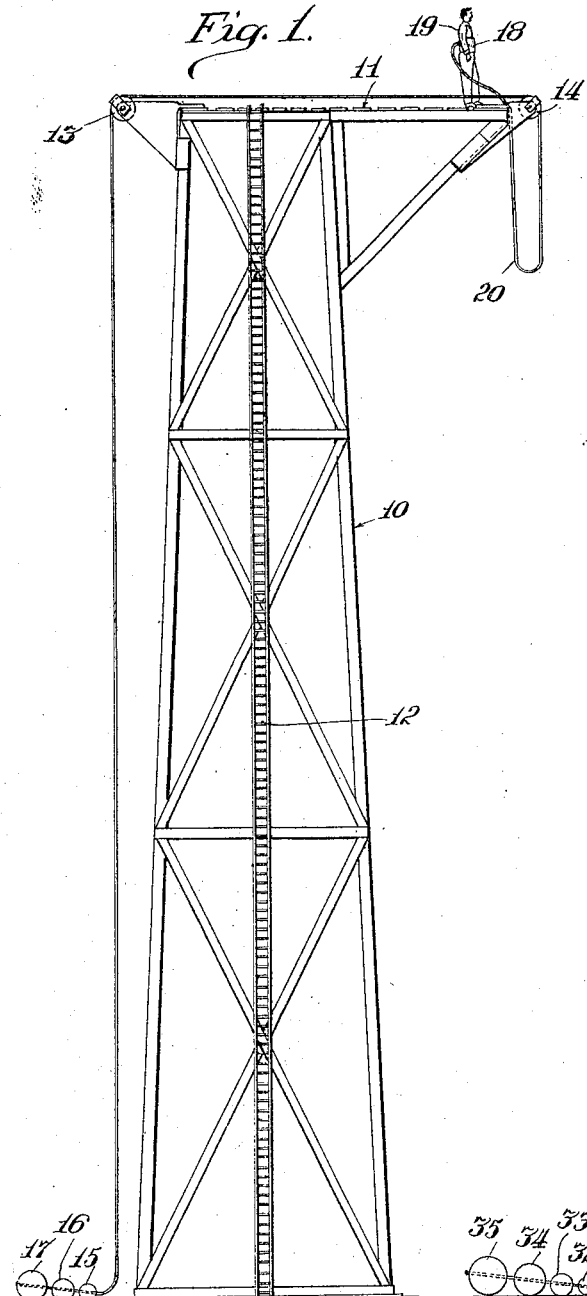
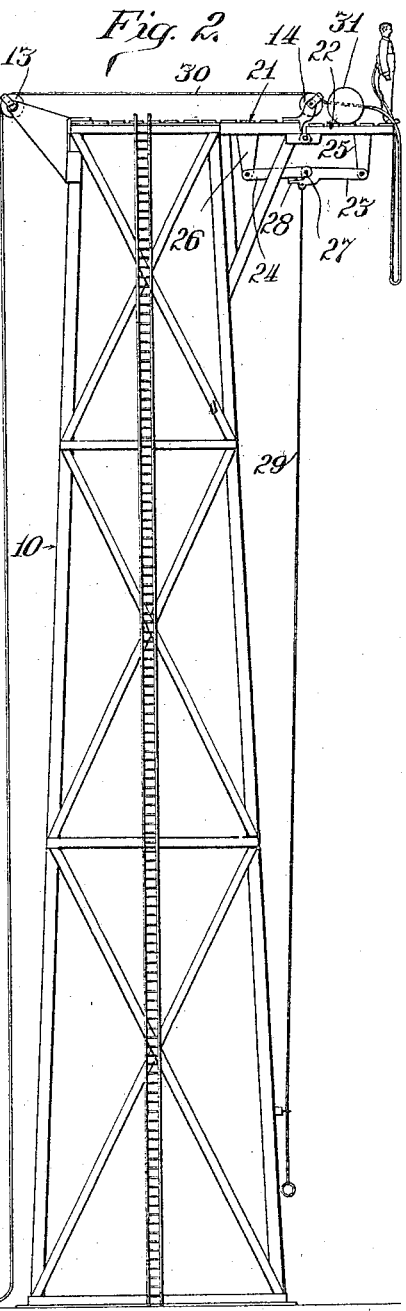
Inventor  
Ernest T. Gundlach  
By Barnett & Furman  
Attorneys Patented Feb. 5, 1924.

1,482,554

UNITED STATES PATENT OFFICE.

ERNEST T. GUNDLACH, OF CHICAGO, ILLINOIS.

AMUSEMENT DEVICE.

Application filed September 17, 1921. Serial No. 501,389.

*To all whom it may concern:*

Be it known that I, ERNEST T. GUNDLACH, a citizen of the United States, residing at Chicago, in the county of Cook and State of Illinois, have invented certain new and useful Improvements in an Amusement Device, of which the following is a specification.

The object of this invention is to provide a novel structure or apparatus intended to be erected in an amusement park, or similar place, which will give those using it the sensation of falling or jumping from an altitude, without, however, involving any danger of injury.

The invention is illustrated in two different embodiments in the accompanying drawing.

In the drawing—

Fig. 1 shows in side elevation a structure embodying the invention, from the top of which the person performing the feat jumps; and Fig. 2 is a similar view, showing a structure of like character, provided, however, with a trap which is sprung to drop the person from the elevated position.

Referring to Fig. 1, 10 is a tower or other elevated structure, provided at the top with an outwardly projecting platform 11. I have shown a ladder 12 by which a person who performs the feet may climb to the top of the tower. If desired, the tower may be furnished with an elevator, instead of the ladder. At the top of the tower are arranged a pair of sheaves 13 and 14, the latter being at the outer edge of the platform 11. Over these sheaves extends a rope, chain, or cable, the term "cable" being used in the claims generically to specify such flexible element. The lower end of the cable is provided with a plurality of counterpoises 15, 16 and 17, preferably of graduated weight, of which there may be any number requisite for the purpose. The other end of the cable is furnished with a belt or harness 18 for attachment to the body of the person (indicated at 19) performing the feat. The counterpoises 15, 16 and 17 rest upon the ground, or some other support, and preferably the cable is of such length that there is a certain amount of slack when the person is standing on the platform, the slack being indicated at 20.

In Fig. 2 the structure is modified in two respects: in the first place, there is hinged to the upper end of the tower, preferably to the outer edge of the stationary platform 21, a trap 22 which is sprung so as to cause the person to drop from the elevated position. I have shown the trap supported by a pair of links 23, 24, pivoted to brackets 25, 26, on trap 22, and platform 21, respectively, and pivoted to each other at 27, the link 23 being provided with a finger 28 which projects under link 24 and holds the pivot point 27 between the links a trifle above the pivot points of the links on brackets 25, 26. Links 23, 24 form a toggle joint, which is broken by pulling on a cord 29 attached to finger 28.

The second feature of difference (which might be employed in connection with the form of the invention shown in Fig. 1), consists in providing the end of the cable 30 attached to the person with a weight 31, larger than the first of the graduated weights 32, 33, 34 and 35, on the other end of the cable. The weight 31 is dropped when the trap is sprung, and sets the cable in motion, raising the first or lightest of the counterpoises, so that the shock on the person falling, at the time the slack in the cable is taken up, is diminished.

It will be understood that the drawing illustrates the invention in a simplified, and somewhat diagrammatic manner. Modifications within the scope of the appended claims of the structures shown and described, are contemplated by the inventor.

Operation: The person, after ascending the tower, fastens the belt or harness 18 around his body, and either jumps from the tower (Fig. 1), or is dropped by the springing of trap 22 (Fig. 2). The first part of the fall, that is to say, until the slack 20 is taken up, is unimpeded. As soon as the slack is taken out of the cable, the counterpoises 15, 16, 17 or 32, 33, 34, 35, are raised from the ground, one by one, so as to gradually slow up the fall. Where the weight 31 or equivalent device, is employed, shock on the person, at the time the counterpoises begin to act to slow up the fall, is diminished, because weight 31 has already acted to set the cable in motion over the sheaves.

I claim:

1. In an amusement apparatus, the combination of an elevated structure, and a cable movably supported at the top of the structure provided with means for attaching it to a person and with means comprising elements which are effective, successively, to oppose the weight of a person falling from said structure so as to gradually counterbalance the weight of said person.

2. In an amusement apparatus, the combination of an elevated structure, and a cable movably supported at the top of the structure provided with means for attaching it to a person and with means comprising elements which are effective, successively, to oppose the weight of a person falling from said structure so as to gradually counterbalance the weight of said person, said last named means arranged so that the counterbalancing action does not commence until after a free fall of the person for a certain distance.

3. In an amusement apparatus, the combination of an elevated structure, and a cable movably supported at the top of the structure provided with means for attaching it to a person and with a series of counterpoises of graduated weight which come into action successively to gradually counterbalance the weight of the person when falling from said structure.

4. In an amusement apparatus, the combination of an elevated structure, and a cable movably supported at the top of the structure provided with means for attaching it to a person, and with a series of counterpoises of graduated weight which come into action successively, but only after the person has fallen a certain distance from the structure, to gradually counterbalance the weight of the person when falling.

5. In an amusement apparatus, the combination of an elevated structure, and a cable movably supported at the top of the structure provided at one end with means for attaching it to a person and at the other end with a plurality of normally supported counterpoises of graduated weight which are raised from their support, when the person falls from the structure, successively, beginning with the lightest.

6. In an amusement apparatus, the combination of an elevated structure, and a cable movably supported at the top of the structure provided at one end with means for attaching it to a person and at the other end with a plurality of normally supported counterpoises of graduated weight which are raised from their support, when the person falls from the structure, successively, beginning with the lightest, said weights and cable being disposed so as to leave slack in the cable before the fall begins, for the purpose described.

7. In an amusement apparatus, the combination of an elevated structure, a cable movably supported at the top of the structure provided with means for attaching it to a person and with a series of counterpoises of graduated weight which come into action successively, but only after the person has fallen a certain distance from the structure, to gradually counterbalance the weight of the person when falling, and means whereby said cable is in motion in the direction of the fall of the person at the time that the counterpoises begin to act to slow up said fall.

8. In an amusement apparatus, the combination of an elevated structure, a cable movably supported at the top of the structure provided at one end with means for attaching it to a person and at the other end with a plurality of normally supported counterpoises of graduated weight which are raised from their support, when the person falls from the structure, successively, beginning with the lightest, said weights and cable being disposed so as to leave slack in the cable before the fall begins, for the purpose described, and a weight on the end of the cable attached to the person, which falls with him, for the purpose described.

9. In an amusement apparatus, the combination of an elevated structure provided with a trap adapted to be sprung to drop a person therefrom, and a cable movably supported at the top of said structure provided with means for attaching it to the person, and with means comprising elements which come into action successively to gradually counterbalance the weight of said person when falling from the structure.

10. In an amusement apparatus, the combination of an elevated structure provided with a trap adapted to be sprung to drop a person therefrom, and a cable movably supported on the structure provided with means for attaching it to the person and with means comprising elements which come into action successively to gradually counterbalance the weight of said person when falling from said structure.

11. In an amusement apparatus, the combination of an elevated structure provided with a trap adapted to be sprung to drop a person therefrom, and a cable movably supported on the structure provided at one end with means for attaching it to said person and at the other end with a plurality of counterpoises of graduated weight which are raised from the support, when the person falls therefrom, successively, beginning with the lightest, said cable and weights being disposed so as to leave slack in the cable, for the purpose described.

12. In an amusement apparatus, the combination of an elevated structure provided with a trap adapted to be sprung to drop a person therefrom, a cable movably supported on the structure provided at one end with means for attaching it to said person and at the other end with a plurality of counterpoises of graduated weight which are raised from the support, when the person falls therefrom, successively, beginning with the lightest, said cable and weights being disposed so as to leave slack in the cable, for the purpose described, and a weight on the end of the cable attached to the person, which normally rests upon said trap.

13. In an amusement apparatus, the combination of a tower, provided at the top with a projecting platform and with a pair of sheaves, one at the outer edge of the platform and the other at the other side of the tower, a cable extending over said sheaves, provided at one end with a series of counterpoises of graduated weight with the heaviest at the extremity of the cable, and at its other end with means for attaching the cable to a person, the length of the cable being such that when the person is standing on the platform the cable is slack.

14. In an amusement apparatus, the combination of a tower formed with a projecting platform, a trap arranged at the edge of said platform and provided with means for springing it, a pair of sheaves, one at the outer edge of the platform and the other at the opposite side of the tower, a plurality of counterpoises of graduated weight on one end of the cable, with the heaviest at the extremity of the cable, which weights normally rest upon the ground, means on the other end of the cable for attaching it to a person, and a weight on the cable, larger than the first of the counterpoises, which normally rests on the trap, the cable being of such length and the weights so disposed that when the person is standing on the trap there is slack in the cable between such person and the weight.

ERNEST T. GUNDLACH.